United States Patent
Ewing et al.

(10) Patent No.: US 6,774,932 B1
(45) Date of Patent: Aug. 10, 2004

(54) SYSTEM FOR ENHANCING THE TELEVISED BROADCAST OF A GOLF GAME

(75) Inventors: David J. Ewing, Sugar Land, TX (US); Zollie L. Johnson, Sugar Land, TX (US); Donald A. Vossler, Missouri City, TX (US)

(73) Assignee: Ewing Golf Associates, LLC, Sugar Land, TX (US)

( * ) Notice: Subject to any disclaimer, the term of this patent is extended or adjusted under 35 U.S.C. 154(b) by 903 days.

(21) Appl. No.: 09/669,812

(22) Filed: Sep. 26, 2000

(51) Int. Cl.[7] ............................ H04N 7/18; A63B 69/36
(52) U.S. Cl. ........................ 348/157; 473/199; 473/266
(58) Field of Search ........................ 348/61, 143, 159, 348/157; 473/199, 266; 434/252

(56) References Cited

U.S. PATENT DOCUMENTS

| | | | |
|---|---|---|---|
| 4,975,770 A | | 12/1990 | Troxell |
| 5,892,554 A | | 4/1999 | DiCicco et al. |
| 5,906,547 A | * | 5/1999 | Tynan .......................... 473/199 |
| 5,917,553 A | | 6/1999 | Honey et al. |
| 5,953,076 A | | 9/1999 | Astle et al. |
| 6,431,994 B1 | * | 8/2002 | Firth ............................ 473/266 |
| 6,458,035 B1 | * | 10/2002 | Katayama .................... 473/199 |
| 6,514,081 B1 | * | 2/2003 | Mengoli ....................... 434/252 |

FOREIGN PATENT DOCUMENTS

| | | |
|---|---|---|
| GB | 2233197 A | 1/1991 |
| JP | 08071194 | 3/1996 |
| WO | WO 0114021 | 3/2001 |

OTHER PUBLICATIONS

Golf Green Visualization, Lorensen et al., 8222 IEEE Computer Graphics and Applications 12 (1992).

* cited by examiner

*Primary Examiner*—Chris Kelley
*Assistant Examiner*—Allen Wong

(57) ABSTRACT

A system for the enhancement of a televised golf broadcast, which requires: obtaining detailed topographic measurements of golf greens; inputting these data into a Geographic Information System (GIS) program, smoothing the data, and generating contours on a selected interval; storing and processing the contour data such that it may be viewed from various other perspectives; selecting a real-time televised image of a golf green from a plurality of camera positions; synchronizing and superimposing the contour database image over the televised feed; computing and processing equations of motion which take into account the location of the golf ball relative to the golf cup, the weight of the golf ball, the effect of the wind, the Stimpmeter speed of the green, and the gravitational influence of the slope of the green, to determine a path the putt can take to roll into the cup or to come to rest within 18 inches of the cup; and displaying the combined images along with the projection of the calculated ball path on a real-time televised broadcasts. Before the golfer strikes the golf ball toward the cup, this system provides the viewer with a visual image of an optimal path the golf ball can traverse to result in a successful putt. With the addition of the contours and the calculated trace of the putt trajectory, the viewer has a visual assessment of the break of the putt, without depending upon the announcers' comments. Accordingly, the viewers visual experience is substantially enhanced by knowing in advance of the player's putt, the line which the ball must take to the cup.

18 Claims, 7 Drawing Sheets

Simplified flow chart depicting a process according to the invention.

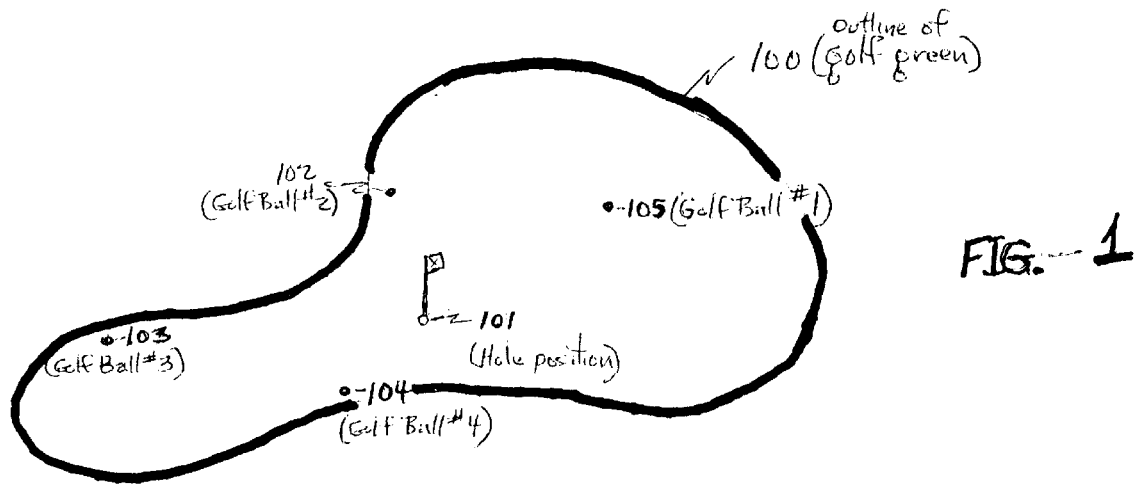
FIG.1  Plan view of a golf green.
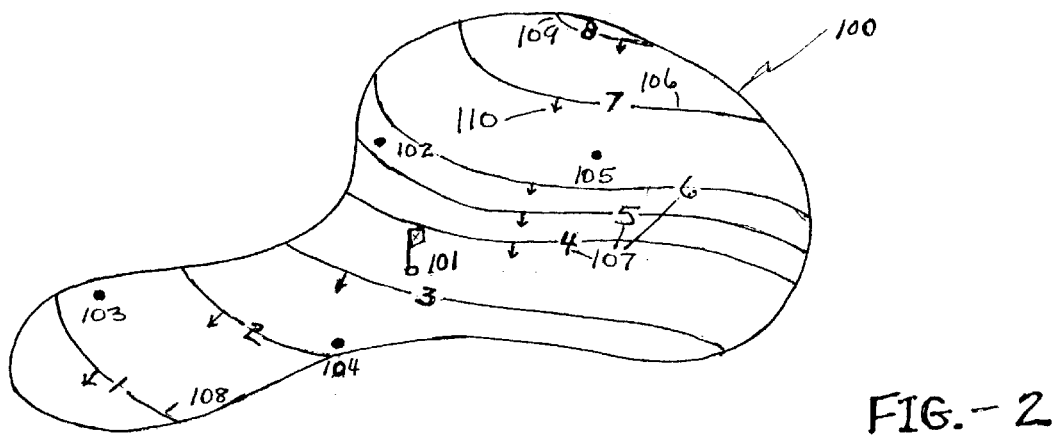
FIG.2  Plan view of a golf green with topographic contours added.

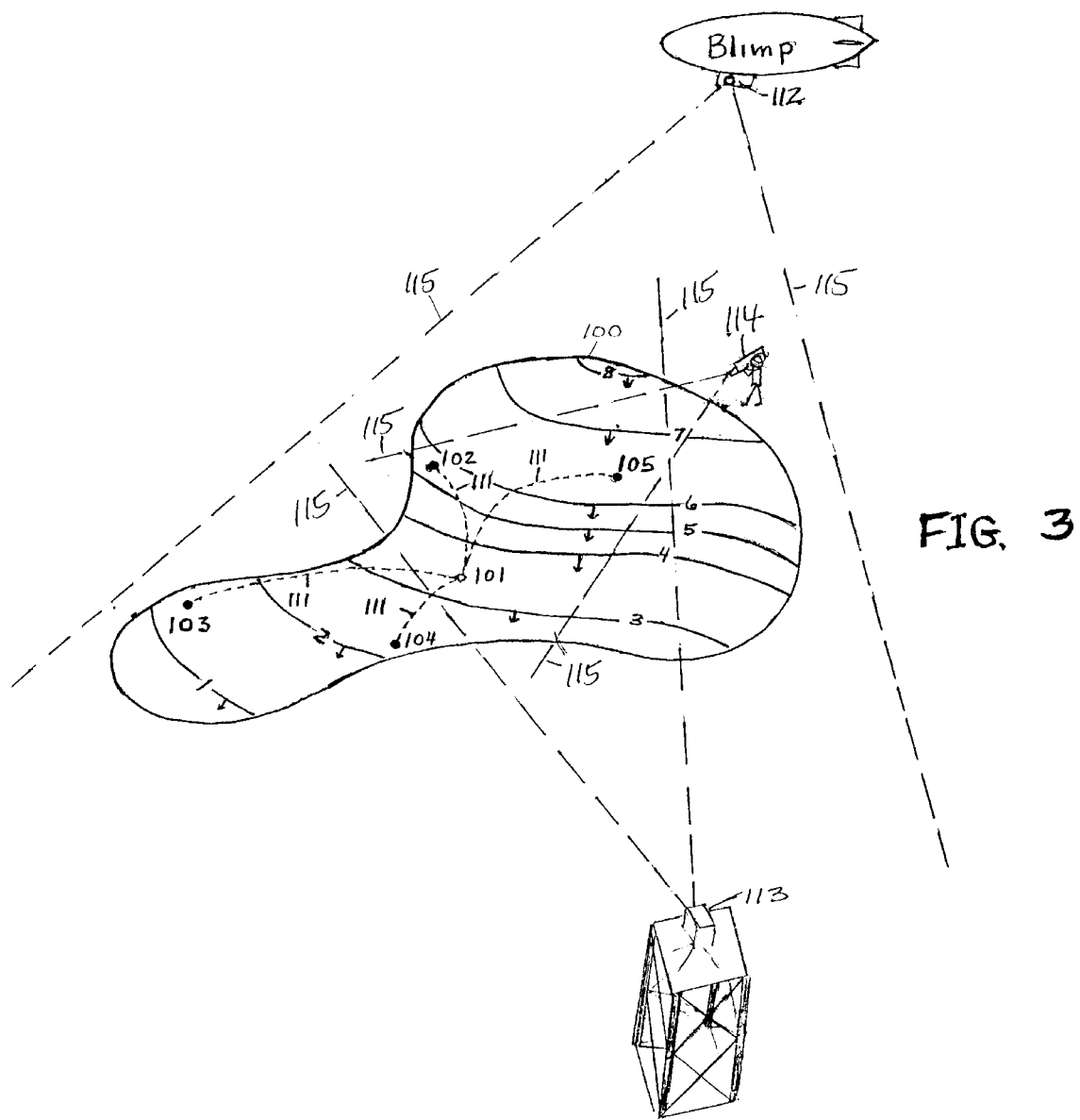
FIG.3  Plan view of a golf green showing the types of camera positions and perspectives and examples of ball trajectories.

FIG.4 Simplified flow chart depicting a process according to the invention.
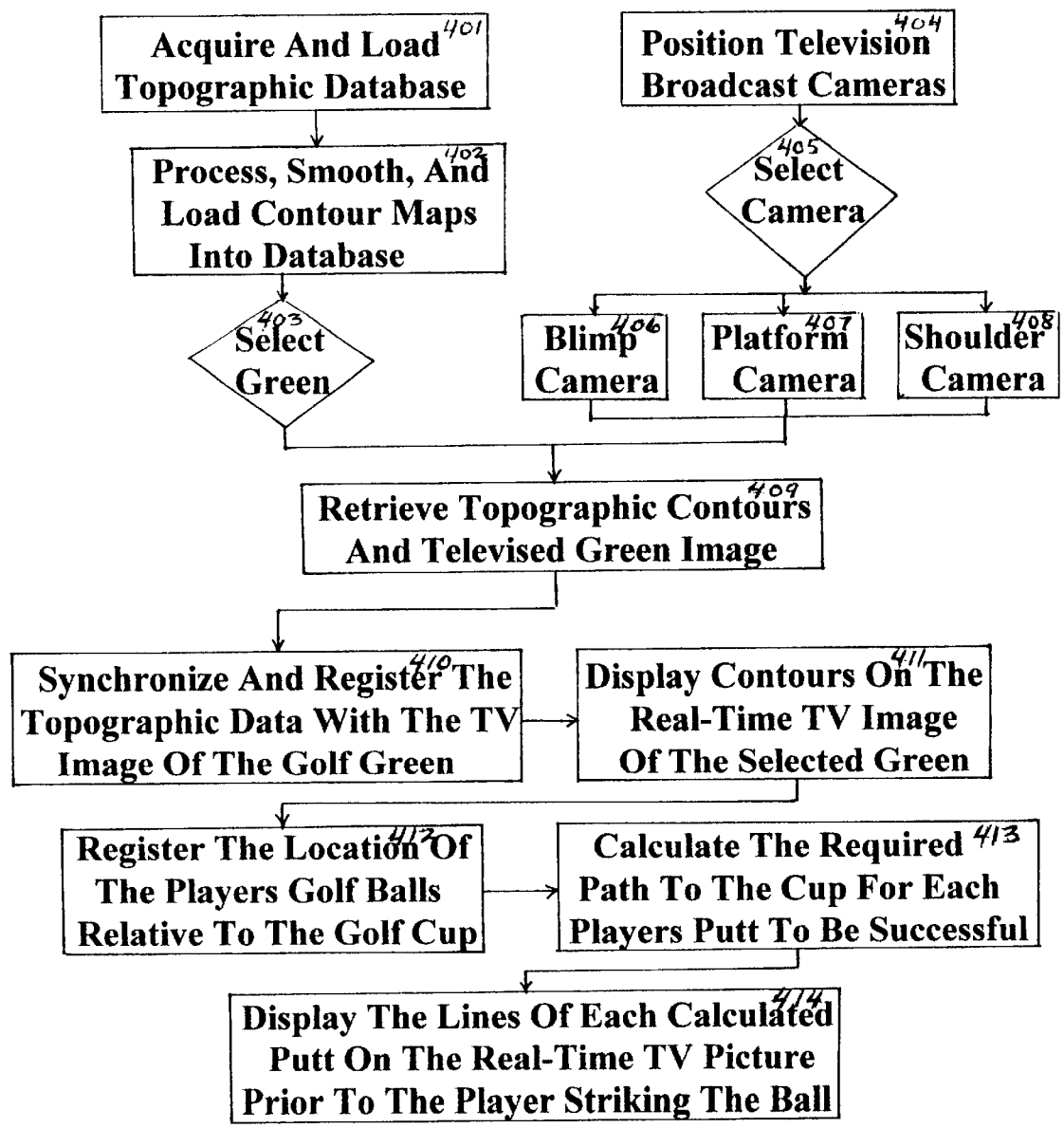

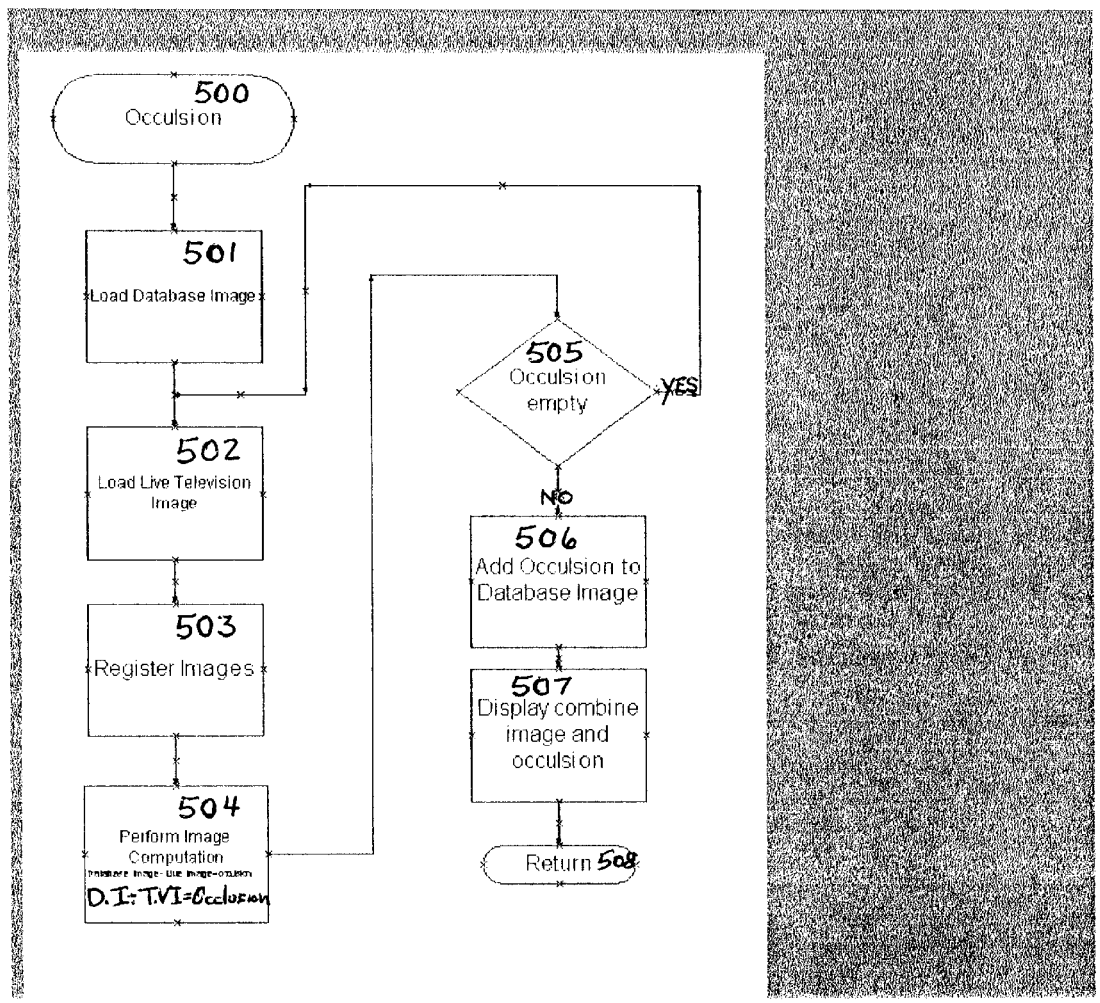
FIG.5 Flow chart showing a computer process used to display occlusions on a green.

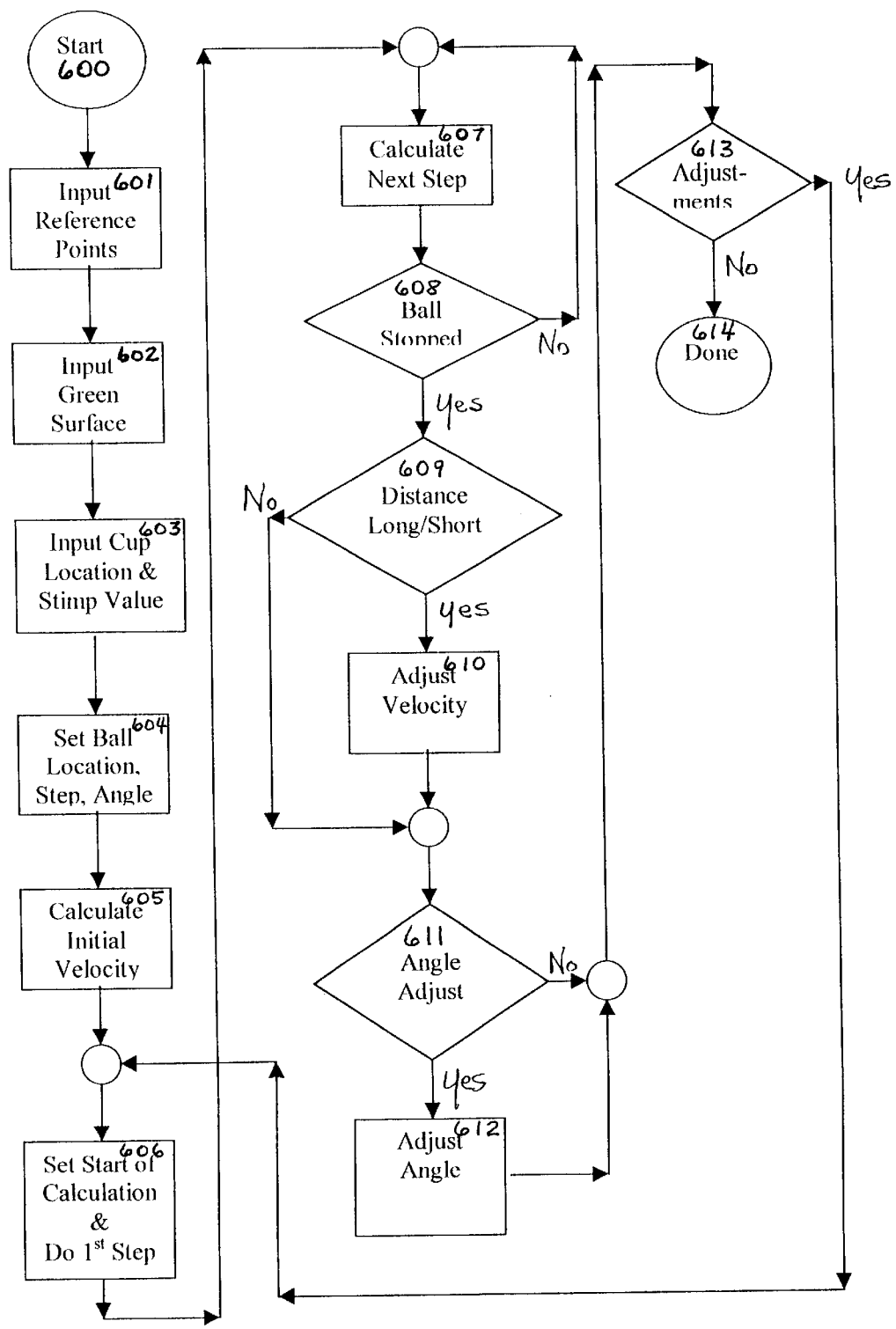
FIG.6 Flow chart showing a computer process used to calculate the trajectory of a golf ball.

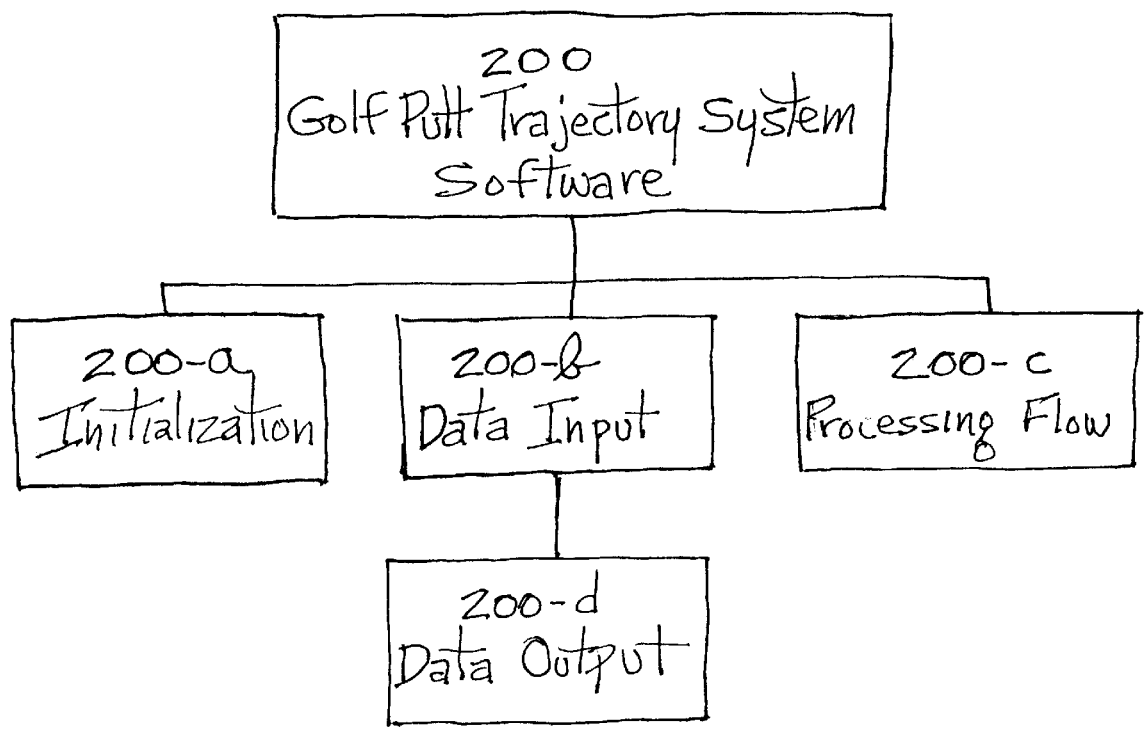
FIG.7  Simplified flow diagram showing components of the main processor.

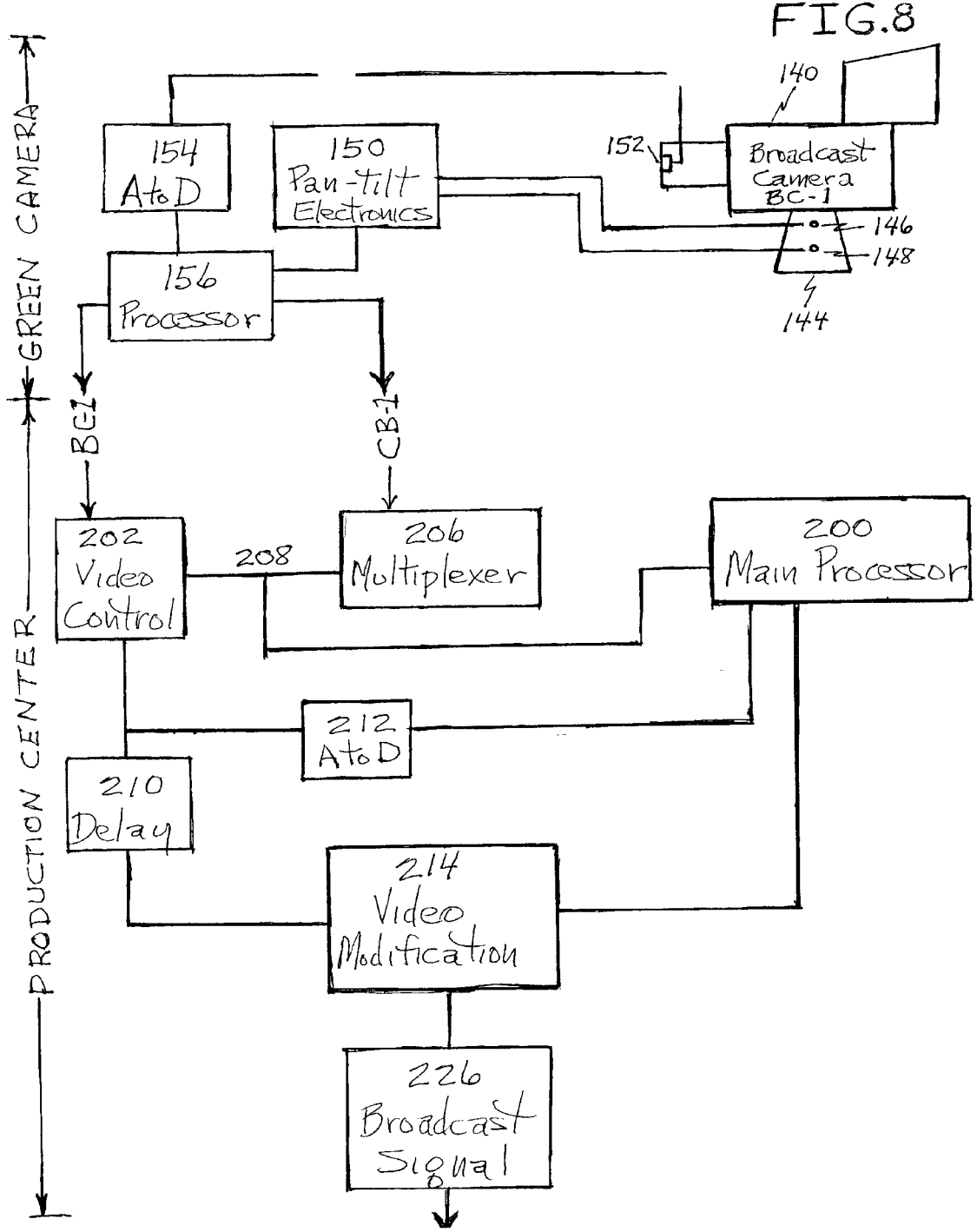
FIG.8 Block diagram showing the components used in the system of the present invention.

SYSTEM FOR ENHANCING THE TELEVISED BROADCAST OF A GOLF GAME

TECHNICAL FIELD OF THE INVENTION

This invention relates to the general subject of sports entertainment, and in particular to apparatus and methods which enhance a viewers enjoyment of televised golfing activities on golf greens. More specifically, the present invention relates to a system for displaying, prior to a golf putt, a desired trajectory for a golf ball to take in order to fall into the golf cup.

BACKGROUND OF THE INVENTION

The televised presentation of the portion of a golf tournament or game which takes place on the golf greens can be significantly improved by enhancing the video broadcast to make the presentation more interesting to the viewers. For example, approximately 50% of the televised video at a golf tournament takes place on the golf greens. However, in the present state of the art, when the players hit their approach shots onto the green, the viewers must rely on the analyst or announcer, who is assigned to that particular green, for an evaluation of the "break" or slope of the green which will influence the players putts. A television screen is a two dimensional display surface. Since there are seldom objects on the television screen which show the viewers a horizontal or vertical line for reference purposes, visually determining from the two dimensional projection on the television screen whether a putt is uphill, downhill, or across the slope of the green is virtually impossible.

Therefore, the viewers are left in a position where they cannot analyze whether, or which way, the putts will break. The only recourse is to accept the analysts opinion and wait for a putt to be struck to visually assess the break. To determine the path required to make the putt, or to lag it close to the cup, the golfer will walk around the green, studying the slopes influencing the putt, and will then mentally compute and select the path and the weight with which the ball must be struck along that path to roll the golf ball into the cup, or to come to rest no further than 18 inches past the cup.

An enhancement is embodied in this invention which will enable the viewers to know the proper line for the putt in advance of the putt being struck. The projection and display of lines of equal elevation, known as contour lines, onto the real-time televised image of the golf green provides the viewing audience with a depth of information exceeding that which is normally available to the analyst who is assigned to that green. These contour lines are spaced at intervals that can be indicated on the video screen. Small arrows can be affixed at right angles to the contour lines showing the viewers the downslope direction on the green.

Elevation numbers can be shown on the contour lines, and these together with the arrows pointing downslope easily enable the viewers to assess the difficulty of the various players' putts by studying the direction and amount of slope, i.e. either uphill, downhill, side-hill, or flat, between each golf ball and the golf cup. With minimal training by the analyst, the unfamiliar viewers can readily determine, using the present invention, which putts are the least or the most difficult, thereby greatly enhancing their viewing enjoyment of the match.

The broadcast networks have at various times attempted to show the break, i.e. the curved path, of the putts by having the analyst draw a crude line on the video screen between the golf ball and the cup. However, this line is only a rough approximation of the true trace (track or trajectory) of the putt and the viewers are still not certain of the break until after the golf ball has been struck by the player and is rolling toward the cup, at which time they can actually perceive it on the two dimensional TV screen.

The broadcast networks have also attempted the use of various graphic depictions of the greens. These graphics have generally been rotated to give the illusion of a three dimensional view of the green. However, because an exaggerated vertical scale is usually used on these graphics, there must be a return from graphics to the real-time television image of the green before the player strikes the ball. Since the real-time image does not allow the viewers to visually determine the break in advance of the ball being struck, it still leaves the viewer dependent upon the live broadcast analyst for information regarding the break on each players golf ball.

Another useful enhancement embodied in this invention is the projection and display of the calculated line of the putt on the real-time video screen. This projection is based upon an equation of motion which calculations incorporate the weight of the ball; the relationship between the ball and the hole; the Stimpmeter measurement or speed (frictional resistance) of the green; and the gravitational influence on the roll of the ball. This enhancement adds immensely to the viewers' enjoyment by allowing them to see the trace (track or trajectory) of the path of the putt annotated and displayed on their television screen before the putt is struck.

The addition of these enhancements to the golf tournament viewers' television screen provides more information for the viewers use than has previously been available and can stimulate their interest in more closely watching golf tournament activities which take place on the greens.

BRIEF SUMMARY OF THE INVENTION

In accordance with the methods and apparatus of the present invention, a system is disclosed which enables the viewers of a televised broadcast of a golf tournament to determine the proper line of a player's putt toward the golf cup, before the player strikes the golf ball, thereby greatly enhancing the viewers' enjoyment of the game. This system comprises methods and apparatus for: obtaining detailed topographic measurements of the greens on a golf course; inputting these data into a Geographic Information System (GIS) program, smoothing the data, and generating contours on a selected interval to generate a database image; storing and processing the contour data such that it may be viewed from various perspectives; selecting a real-time televised image of a golf green from a plurality of camera positions; synchronizing and superimposing the aforesaid database image over the televised live video feed to achieve registration; computing and processing an equation of motion which takes into account the initial ball position, the speed of the green, the wind effect, and the gravitational influence of the slopes, to determine an optimal path the ball can take to roll into the golf cup, or to come to rest within 18 inches of the cup; and displaying the combined images along with the projection of the calculated ball path on a real-time televised broadcast. Before the golfer strikes the golf ball toward the cup, this system provides the viewers with a visual image of a path the golf ball could traverse to result in a successful putt.

Referring to FIG. 4, the first step in the process is to acquire detailed topographic data on the putting greens of a selected golf course. Accurate surveying instruments must be used, which will provide elevations with minimal error. These data are then loaded into a system control computer database and processed to create smoothed contours on desired intervals, which best portray the slope details of the golf greens. One of the greens can then be selected for viewing, and the appropriate contours can be brought up out of the database. Concurrently, a real-time television image of the selected green, or an image which was stored in the database before tournament play began, can be retrieved from the database, along with the contours for that green, and the two images are then synchronized and registered.

Television broadcast cameras are traditionally deployed in a plurality of positions around golf greens at a golf tournament, with particular emphasis on three specific camera positions. The first camera is positioned aboard a lighter-than-air blimp, which circles over the golf course and which has the capability of focusing on any of the greens on the course. A second camera, known as the platform camera, is typically positioned immediately adjacent to each green on a platform reserved specifically for the use of this camera. Thirdly, multiple green-side positions are available to a shoulder-held camera which can be used to obtain close-up shots of the players' activities on and around the golf greens.

The real-time TV picture of a green can then be selected. This picture originates from one of the three camera positions assigned to monitor the green. As the approaching players' golf balls land on the green and come to rest, their positions are determined and registered using a mouse, light pen, digitizing tablet, or other pointing device, and this data is incorporated into the database. Alternatively, the rest positions of the golf balls and the position of the shoulder-held camera can be located and registered by shooting them in with a laser surveying instrument or in the case of the shoulder-held and blimp cameras, they can be located and registered using a Global Positioning System (GPS) package attached to the cameras. Similarly, pattern recognition techniques could be used to register the ball and camera positions by comparison with the video image of the empty green held in the database. In any event, these initial positions, which are necessary as input data to the system of the present invention, are obtained by one of the above described methods.

In the next step, equations of motion which take into account the physical relationships between the balls, the cup, the speed of the green, and the gravitational influence of the slopes, are used to calculate and to determine a trajectory which will result in a golf ball rolling into the cup, or coming to rest within 18 inches of the cup. Successively, the trajectory of each remaining putt can be calculated and can be displayed on the screen, and these annotations superimposed over a live image, prior to the players' putting the golf balls.

There are many variations which could be employed in the use of these three camera positions. However, one camera position sequence which can be visualized begins with the overhead blimp camera zooming-in on a green which is being approached by a group of golfers. The contours for that specific green can be synchronized with the real-time television feed of that green and displayed on the screen prior to or as the approach shots are landing on the green. Prior to the arrival of the players, the announcer can discuss with the viewing audience the preferred landing area on the green and the effect of the contoured slopes on the individual players putts as their golf balls land on the putting surface.

The televised picture can then be switched from the blimp camera to the platform camera, to focus on the overall green, and then zoomed-in to focus on a specific player's putt. When the player has finished examining the slopes of the green in relation to his or her putt, and is moving into position to strike the putt, the televised picture can then be switched to the green-side, shoulder held camera, which has typically taken a position behind the player, in line with the hole, such that the roll of the green, or the break of the putt can best be visually observed by the television viewers. The contours which create the break on the putt are in view on the screen in their proper perspective, and these contours allow the viewers to anticipate the path which the putt will take prior to the ball being struck. The calculated trajectory (track or path) of the putt can also be shown on the screen and optionally can be left on while the putt is struck, or it can be removed just prior to the players putt. This same general sequence of camera positions, using principally the platform and shoulder cameras, could be repeated on each of the remaining player's putts. The camera sequence described above or a plurality of variations, can be used to display the enhancements contained in the present invention.

Advantages of this invention are the addition of the contours and the calculated ball trajectory to the television viewers' screen. The presence of the contours will for the first time allow the viewer to comprehend and read the slopes of the green, and the plot of the trace of the ball trajectory will provide the viewer with a competent visual assessment of the break of the putts before they are struck. This type of information and degree of accuracy has never before been available to the audience viewing the broadcast of a golf tournament.

Other features and advantages of this invention will be understood from the following detailed description thereof when taken in conjunction with the accompanying drawings which are intended as illustrative and not limitations.

BRIEF DESCRIPTION OF THE DRAWINGS

FIG. 1 Plan view of a golf green.

FIG. 2 Plan view of a golf green with topographic contours added.

FIG. 3 Plan view of a golf green showing the types of camera positions and perspectives and examples of ball trajectories.

FIG. 4 Simplified flow chart depicting a process according to the invention.

FIG. 5 Flow chart showing a computer process used to display occlusions on a green.

FIG. 6 Flow chart showing a computer process used to calculate the trajectory of a golf ball.

FIG. 7 Simplified flow diagram showing components of the main processor.

FIG. 8 Block diagram showing the components used in the system of the present invention.

DETAILED DESCRIPTION OF A PREFERRED EMBODIMENT

While this invention is susceptible of embodiment in several different forms, there is shown in the drawings, and will herein be described in detail, one specific embodiment of the invention. It should be understood, however, that the present disclosure is to be considered an exemplification of the principles of the invention and is not intended to limit the invention to the specific embodiment so described.

FIG. 1 depicts a plan view of the outline of a golf green 100. In the middle of the green is a golf cup 101, which is marked by a flag. Also situated on the golf green are four golf balls 102,103,104, and 105. Although the viewers perspective of the outline of the golf green 100 will vary dependent upon the camera location, the only thing they will see when the initial televised image of the green 100 appears on their TV screen, is the featureless two dimensional plan view shown in FIG. 1. This view shows no depth perspective and as a result will give the viewer the impression that the line of the putts for balls 102,103,104, and 105 may be straight into the golf cup 101. This is generally not the case. However, in the present state of televised golf tournament presentations, the viewer is completely dependent upon the opinions of the network commentator, for information regarding the break or trajectory of these putts.

This invention embodies an enhancement of the viewers interest in a televised golf tournament by providing specific annotated information to the viewer which will enable them to perceive the green 100 in a 3-D perspective and to be able to visualize a proper path for a players putt before it is struck. FIG. 2 shows the same golf green outline 100 seen in FIG. 1, with the addition of an example set of topographic contours 106. Contours are lines of equal elevation. The viewer will be able to see in which direction(s) the slope(s) of the green are tilted, by observing the numbers on the contour lines 107. The numbers will increase from the lowest numbered (1) contour 108 to the highest numbered (8) contour on the green 109, i.e., the green slopes from contour 8 down to contour 1. Small vector arrows 110, which are orthogonal to the contour lines, pointing in a downslope direction may be affixed to each contour line 106. The contours 106 may be shown as thin solid or dashed lines; by different colored lines or shading between contours; by a blinking line; or by a variation in the brightness or by any other shape or graphic technique deemed appropriate. All such variations are within the concepts of the present invention.

Gravity acts on a moving golf ball at any point in its trajectory causing it to roll into a position parallel to the maximum pitch of the slope, and therefore at a right angle to the contours 106. Accordingly, if the ball is rolling across a slope, it will curve until it is rolling straight down the slope. If it is rolling upward across a slope, it will tend to curve rapidly in a downhill direction as it slows down. As an example of this principle, the contour 106 configuration shown in FIG. 2, relative to the golf ball positions 102,103, 104,105, would immediately indicate to the viewers that all four putts would need to travel, along a curved rather than a straight line to end up near the golf cup 101.

In FIG. 3 the short dashed lines 111 between the four golf ball positions 102,103,104,105 and the cup 101 illustrate trajectories 111 that the golf balls could follow in response to the influence of gravity as they traversed the contoured surface of the green toward the golf cup 101 from the four ball positions. The actual trajectories may be calculated using these equations of motion which take into account the other factors influencing the path of the golf balls. These factors are subsequently discussed in more detail under the section on "Golf Putt Trajectories".

Also shown on FIG. 3 are the three principal camera positions typically used during the televised broadcast of a golf tournament. They are the blimp-based camera 112, the platform camera 113, and the shoulder-held camera 114. The blimp-based camera 112 generally circles over the tournament golf course at an elevation of 1000–1200 feet and has the ability to zoom-in on any of the greens 100. A fixed platform camera 113 is installed adjacent to each green where television coverage is planned. The third camera is a shoulder-held camera 114 which moves freely around the golf course filming footage of the competitors. When the players reach the green 100, this camera 114 often takes a position at the edge of the green 100 behind the player whose turn it is to puff, to give the television viewers the best camera angle to observe the break or trajectory of the players golf ball after it is struck.

The long dashed lines 115 radiating from each camera are examples of possible perspectives which might be observed by these cameras. The illustration shown in FIG. 3 is intended to demonstrate the wide field of view 115 of the blimp camera 112; the more restricted field of view 115 of the platform camera 113; and the limited field of view 115 generally seen by the shoulder-held camera 114.

FIG. 4 is a simplified flow chart or diagram depicting the process according to the concept of the invention. Topographic data from each green on a golf course are acquired and loaded into a system control computer database 401. These data are then processed and smoothed 402, and contour maps on selected intervals prepared and stored. TV images of each green are also digitized and loaded into the database well in advance of the beginning of tournament play. Platform based television cameras are typically put into position 400 on all greens where televised coverage of a tournament is desired. A blimp carrying a television camera generally circles the golf course overhead taking pictures and roving cameramen move about the course obtaining coverage of the competing golfers. When a green is selected 403 by the Television Director for viewing, one of the camera positions is also selected 405, i.e. camera 406, 407, or 408 is selected as a video source for this coverage. The stored contours, green outline, and cup position for the selected green are retrieved at step 409, and are synchronized, and registered with the televised image of the golf green 410. The contours are then superimposed over the real-time TV picture of the green 411. As golf balls arrive on the green and come to rest, their location is registered 412 and stored in the database. The equations of motion then calculate an optimal path or trajectory which each ball should follow on its path to the cup, to come to rest within 18 inches of the cup 413. The trace of this line or trajectory is displayed at step 414 on the viewers live video screen before the putt is struck.

In a real-time televised golf tournament presentation, the present invention can bring up on the TV screen an image of the green 100 chosen for viewing from one of the plurality of camera positions, with the contours 106 superimposed over the real-time televised picture. Registration of the contour data with the real-time TV picture is accomplished through the use of known pattern recognition technology, which aligns the perspectives of the surveyed green-edge with the live televised green-edge. This registration enables the use of a mouse, pointer, or a computer tablet to locate precisely the at-rest position of the balls 102, 103, 104, 105, the cup 101, and the shoulder-held camera 114 relative to the information contained within the database in the main processor 200. These positions may also be registered onto the live image by shooting them in with a laser surveying instrument.

On each green 100 where televised coverage of a tournament is desired, the location of the platform camera 113 should be determined in advance of tournament play by conventional surveying methods, and its three dimensional x,y,z coordinates stored in database 200-a, along with the outline of the green-edge.

The preferred method for determining the location of the shoulder-held camera 114 would employ the use of a Global Positioning System (GPS) receiver-radio transmitter package. One such unit is marketed by the Trimble Company of, Sunnyvale, Calif., and would be attached to the camera 114 to obtain the x,y,z coordinates necessary for registration with the database 200-*a*. The same method could be used to locate the position of the blimp-based camera 112 for registration of an image of the green 100 and the contours 106.

Referring to FIG. 5, an important aspect of this invention is the ability of the computer process 500 to allow the players to walk up onto the green 100 and obscure or occlude the contours 106 underfoot and in the background of their images. This effect is accomplished by storing the image of a green 100 in the database 501; loading into the database 501 the live video image of the selected green 502; registering these two images 503; subtracting out the occluded images of the golfers as the difference between the stored and the registered real-time images 504; overlaying the stored topographic contour image on top of the real-time image of the green 506; and then projecting the real-time image of the golfers back onto the contour overlay for display 507 on the television viewers screen.

When the ball trajectories 111 are to be projected onto the television screen, they will be overlaid onto the image of the green 100, or superimposed onto the contours 106, as appropriate, before the subtracted image of the golfers is overlaid at step 507. These trajectories may be represented graphically by various thicknesses of solid, dashed, or dotted lines, or by many other symbol configurations, as desired. These symbols may also be presented using various colors or shades of light. The trajectories 111 are calculated using equations of motion which compute a range of lateral movement of the players golf balls, taking into consideration the frictional coefficient of the greens, the gravitational influence of the slope of the green, and the location of the golf balls relative to the golf cup 101, to arrive at the optimum trajectories 111 for the individual putts.

Golf Putt Trajectories

This invention utilizes basic principles of physics to compute a possible range of lateral trajectories that a golf ball may traverse to come within a specified distance of the golf cup 101. The starting point for this procedure is summarized in FIG. 6 and is the establishment of a digital database 601 of very dense topographic measurements of the entire area of the green 100 and some of the surrounding area. Approximate x,y,z coordinates on the green surface could be obtained with the most accurate GPS equipment. However the error inherent in this survey system would provide poor results with this invention on the relatively flat areas of the green. The most accurate topographic measurements can be obtained through the use of conventional surveying equipment or 3-D laser mapping equipment, such as the Cyrax System, marketed by Cyra Technologies of Oakland, Calif. From these data a numerical model 602 of the surface of the green 100 and surroundings is computed. This numerical model serves a variety of purposes. From it, contours 106 may be computed for easy visualization of the green topography. Additionally, the green model makes it possible to compute the slopes everywhere on the green quickly and accurately. This facilitates the computations of the effects of gravity on the trajectory 111 of a golf ball when it is putted toward the golf cup 101.

The following equations of motion are used iteratively to calculate the motion of the golf ball and to derive a trajectory as it traverses a green 100 of varying slope. The x and y-subscripts used in the equations of motion refer to the component of the particular variable in the x or y-direction.

1. $v_{0x} = v_0 \cos \theta$
2. $v_{0y} = v_0 \sin \theta$
3. $g_x = g \sin \alpha \cos \beta$
4. $g_y = g \sin \alpha \sin \beta$
5. $f_x = f \cos \alpha \cos \beta$
6. $f_y = f \cos \alpha \sin \beta$
7. $a_x = g_x - f_x$
8. $a_y = g_y - f_y$
9. $v_x = v_{0x} + a_x \Delta t$
10. $v_y = v_{0y} + a_y \Delta t$
11. $\Delta x = \Delta d \cos \theta$
12. $\Delta y = \Delta d \sin \theta$
13. $v_x^2 = v_{0x}^2 + 2 a_x \Delta x$
14. $v_y^2 = v_{0y}^2 + 2 a_y \Delta y$ The definitions of the symbols used in the above equations are as follows:

$\theta$=Angle of direction of travel measured from the x-direction $\alpha$=Slope angle measured downward from horizontal $\beta$=Angle of direction of maximum slope at a point measured from the x-direction $\Delta d$=Distance traveled along trajectory in a single computational step v=Velocity at any time after having traveled some distance, s(x,y,z)

$v_0$=Initial velocity a=Acceleration factor—combines both gravitational and frictional forces (g−f)

g=Gravitational acceleration value f=Deceleration term accounting for frictional effects $\Delta x$=Distance traveled in x-direction in a single computational step $\Delta y$=Distance traveled in y-direction in a single computational step $\Delta t$=Time required during a single computational step FIG. 6 is a flow chart showing the computer process required to calculate an optimal trajectory 111 which a golf ball can follow to result in a successful putt, i.e., one which rolls into the cup 101 or comes to rest within 18 inches of the cup 101. As is shown in FIG. 6, to start this process 600, each green 100 must be accurately surveyed as previously discussed. In addition to the dense topographic measurements on each green 100, it is necessary to measure multiple reference points 601 around the perimeter of the green 100. Such reference points 601 should be permanent features of the area surrounding the green 100 since the topographic database can be usable for many years. The sprinkler heads and drains at the edge of the green 100 are permanent features and are particularly well suited for this purpose. Image registration is accomplished by using these features around the golf green which were surveyed in during the data gathering process. The position of the sprinkler heads and the shape of the outline of the green are used to register the database green image with the live video image.

Since the cup 101, as shown in FIGS. 1 and 2, is moved each day during tournament play, it is necessary to re-enter the new cup 101 location into the database 200 daily. If the distance from the cup 101 to three or more of the reference points 601 is measured, then simple geometric computations suffice to accurately locate the cup 101 position. One most straightforward method is that of intersecting circles. An arc of a circle having the ball-to-cup distance as radius and centered at the reference point 601 is calculated for each reference point 601 used in locating the cup 101. Any arc calculated for an erroneous measurement will noticeably diverge from the other values. That is why multiple reference point 601 measurements are necessary. All of the points of intersection of the arcs or the closest points for non-intersecting arcs are averaged to yield the optimum cup 101 coordinates. The necessary measurements can be made very quickly with a 100 foot steel tape measure. The new cup position each day could be located accurately with a steel tape, or surveyed in with conventional surveying instruments, or its x,y,z coordinates could be input into the database 200 using a mouse, pointer, or a computer keyboard, etc.

The numerical surface used to model the green surface 602 is computed from the data samples recorded when the green 100 was surveyed (e.g., 3-D laser scan). The data as collected is pre-processed using a data decimation process that yields a version of the data in which the average point-to-point distance in the data is a specified distance, typically 0.5–1.0 inches. The decimation process involves computing a moving window over the sorted data and replacing all points falling within a window by a single value that is the average of all of the points falling within the window. The decimation window is square with the sides being the length of the desired average point-to-point separation. Averaging, rather than deleting excess points, guarantees that the data-set is consistent for the chosen decimation window.

Once decimation is completed, a triangular mesh is constructed containing all of the data points as the mesh nodes. The mesh geometry thus defines the geometric relationship of each node to the surrounding nodes. Once the geometric relationships of the points has been defined via the mesh geometry, x and y-partial derivatives (spacial) are computed for each node thereby allowing a continuous surface to be computed anywhere within the area covered by the mesh. Therefore at every location within the mesh, both data and derivative values are defined. The decimation, triangulation and interpolation functionality described above are implemented in a commercial mapping software library such as Contour™ and GFT™ as provided by V-Tech of Missouri City, Tex. If the data collected on a green 100 is obtained through the use of conventional surveying equipment, there is no need to apply the decimation process.

To facilitate the slope computations, an integral part of the numerical processing used to build the numerical surface model of the green 100 is a triangulation of the point set. At each node of the triangulation, x and y directional derivatives are calculated. These derivatives are the rate of change of elevation along the x and y directions respectively. Derivative calculation at the nodes may be accomplished using a wide variety of methods. Sometimes, local analytical surface fits are performed about each node to define derivatives. Least squares fits to low order polynomials is also a useful method. Another very simple, but effective method is to fit a plane through each of the triangles having a common node. Then a weighted averaging of the slope components is performed to define the values at the node. The weights are usually dependent on the areas of the contributing triangles. It is possible to rapidly determine which triangle any point falls within along the calculated trajectory. The slope and z-value anywhere within a triangle may be easily interpolated from the corner node values. Along any edge of a triangle, the slopes are simply linearly interpolated from one node to the next. The slope components at an arbitrary point within a triangle are determined by first linearly interpolating along the bounding triangle edges and then to the interior point. This is a standard technique in numerical surface modeling for mapping applications. Along the edge of a triangle the z-values are interpolated as a linear combination of the projected values from the bounding nodes. Each nodes' contribution is modeled mathematically by an equation of the form:

$$z=Ax+By+C$$

The "A" coefficient is the slope in the x-direction and the "B" coefficient is the slope in the y-direction. If the bounding vertices of the triangle are "1" and "2", then the z-value anywhere in between the bounding values is given by:

$$z=(1-t)z_1+tz_2,$$

where $z_1$, and $z_2$ are vertex z-values and "t" is the fraction of the distance between points "1" and "2" such that $0<t<1$. Similarly, the z-value at an interior point is linearly projected from the values on the edges. Much more sophisticated interpolation schemes might be used in place of the above. In practice, with well defined data-sets such as those in use for mapping green surfaces, there is little to be gained from the use of more complicated models.

Prior to computing the golf ball putt trajectories 111 on a green 100, the location of the cup 101 is input into the database 200. In addition, the speed of the green 100 must be known in order to determine the coefficient of friction to use during the trajectory computations. The green speed is specified in terms of a Stimpmeter value for the green 100. A Stimpmeter is an extruded aluminum stake, 36 inches long, with a V-shaped groove extending along its entire length. It has a notch 30 inches from the tapered end, which rests on the ground. The notch holds a golf ball and as the other, non-tapered end is slowly lifted, the ball rolls out of the notch and down the grooved bar onto the green 100 when the Stimpmeter inclination reaches an angle of about 20 degrees.

The USGA's Stimpmeter instruction manual advises users to select a level area on the green 100, at least 10 feet by 10 feet; roll three balls down the Stimpmeter in one direction; and mark their average stopping point. Then roll three more balls in the opposite direction, and mark their average stopping point. The two distances are then measured and their average distance, measured in feet and inches, is known as the Stimpmeter value or speed for that green 100.

This distance value may be converted into a frictional deceleration coefficient by the application of a physics equation of motion relating velocity after traveling a given distance to initial velocity and acceleration:

$$v^2=v_0^2-2fx$$

where, $v_0$ is the initial velocity,
 'x' is the distance traveled, and
 'f' is the deceleration coefficient with the minus sign chosen to make f positive. Letting 'x' be the Stimpmeter distance and $v_0$ be the velocity as the ball leaves the Stimpmeter, then v=0 at the Stimpmeter distance:

$$f=v_0^2/2x.$$

In the next operation 604, the parameters that control the start of computation are input. The ball coordinates are specified, and the step size and initial angle are set. Step size refers to the distance that the ball is assumed to travel on each computational cycle. Typically, this would be the same size as the average point-to-point data spacing as this is the real resolution limit of variability within the data. The initial angle is the angle measured from the horizontal that opens positively in a counterclockwise direction. This angle is used in the initial partitioning of velocities and accelerations into x and y-components.

The initial step size and initial velocity values are used to set an internal time increment for the initial step computation. This time increment is simply the step size divided by the initial velocity. This time increment can be used throughout the computations or it can be computed for each step. The choice of an initial velocity 605 used for calculating the trajectory 111 of the ball to the cup 101 is computed from the same equation used to compute the deceleration coefficient:

$$v^2 = v_0^2 - 2fx$$

Here 'x' is the distance from ball to cup plus about 18 inches as the desired radius about the cup; 'v' will be zero; and the equation is solved for $v_0$, i.e., $$v_0 = (2fx)^{1/2}$$

The next step 606, takes the direction angle 604 and the initial velocity 605, and sets up the x and y-components for computation. At this point the numerical green surface 602 will be queried for the elevation and the x, y-slope values. Utilizing the slope components, the gravitational and frictional components are initialized. The final operation calculates the x,y-distances that the ball will move for the first step. The time increment that it takes to move the ball through this distance is also computed.

The next step 607 is calculated utilizing the values computed at the initial value stage or from a previous iteration step, by updating velocity components, direction of motion angles, ball x,y coordinates, elevations and slopes, gravitational acceleration components and new distance and time (if dynamic) elements. At each iteration, the velocity value from the preceding step becomes the current $v_0$. The updated velocity is computed from:

$$v = v_0 + at,$$

where:
a is the acceleration term combining gravity and friction effects, and
t is the current time element for this step (may be constant or dynamic). This equation is applied separately for both x and y-components. The direction of motion angle 604 is re-computed from the updated velocity components. The distance that the ball travels (d) during this time is computed from:

$$d = v_0 t + \tfrac{1}{2} at^2$$

This equation is applied to both the x and y-components after which the ball coordinates are updated.

At the new x,y-coordinates, a new elevation value and new x,y-derivatives (slopes) are computed. Using the slope values, the gravitational acceleration components are re-computed for each direction. New distance components to be used in the next iteration are computed. If the time element is dynamic, it too is computed. If both x and y-distance elements are less than those computed for the specified time element, the ball is assumed to have come to rest and the distance elements are updated accordingly and status flags are set accordingly.

When the ball has come to rest 608, it is necessary to determine if it fell short 609 of the cup 101 location, or rolled too far past the cup 101. Using the distance at termination of the ball motion 608 to cup 101, the initial velocity 605 is modified 610 by:

$$v_{new}^2 / v_{old}^2 = d_{old} / d_{new},$$

where v and d are velocity and distance respectively. The subscript "old" refers to the previous iteration, and the subscript "new" is the value to be used in the next iteration.

If the ball rest position 608 at the end of computations is too far to one side or the other of the cup 101, then the angle 611 is adjusted 612 in fixed increments 613 (e.g., 10-degrees) until the ball position is on the opposite side of the cup 101 from the previous iteration. At this point, the angular increment 612 is halved and added or decremented to the last value such that the resulting angle falls in-between the previous pair of angles. This iterative process continues until the ball motion terminates 614 within the required distance of the cup 101.

To facilitate the slope computations, an integral part of the numerical processing used to build the numerical surface model of the green 100 is a triangulation of the point set.

$$z = Ax + By + C$$

The "A" coefficient is the slope in the x-direction and the "B" coefficient is the slope in the y-direction. If the bounding vertices of the triangle are "1" and "2", then the z-value anywhere in between the bounding values is given by:

$$z = (1-t)z_1 + tz_2$$

where $z_1$ and z are vertex z-values. Then "t" is the fraction of the distance between points "1" and "2" such that 0<t<1. Similarly, the z-value at an interior point is linearly projected from the values on the edges.

The force of the wind and the "grain" or tilted growth pattern of the grass on a green may each possibly have an effect on the trajectory 111 of a moving golf ball. If there is a substantial wind present, the force and direction can be established with an anemometer and a wind or weather vane which are in communication with database 200. A wind effect calculation can be included in the equations of motion discussed above if windy conditions prevail. The effect of grain on grass which has been mowed to a height of 9 or 10/1000 ths of an inch is still being debated. According to personal communications with two United States Golf Association Regional Agronomists, the effect of grain is negligible on grass mowed to this specification for a Professional Golf Tournament. Therefore, the grass grain effect has not been incorporated into the equations of motion set out above.

As previously discussed, the topographic database 200 allows for a variety of graphics overlay displays to be utilized in showing the possibilities/limitations of the trajectories 111 of the putts open to the golfers. Contours 106 of the green 100 may be displayed for easy visualization of the variability of the televised green 100 surface. Either superimposed on the contours 106, or by themselves, the putting trajectories 111 may be displayed as an overlay on the TV image. Full perspective views may be displayed of all overlay data to facilitate registration with a television camera at the site.

Referring now to FIG. 8, generally the production center is housed in a truck or trailer parked somewhere on the golf course property. The heart of the production center is processor 200. The processor 200 can be a powerful computer such as an Onyx 2 computer from Silicon Graphics. Processors 156, which are associated with the broadcast cameras 140 on each televised green 100, can be an Intel Pentium processor, or its equivalent, with supporting electronics. Processor 156 has memory and a disk drive to store data and software. The processor 156 is in communication with pan-tilt electronics 150; analog to digital converter 154; and with the production center via signal BC-1. There are however, other suitable off-the-shelf processors or combinations of processors which can perform the necessary functions of this invention. Each of these will have separate compute and graphics subsystems. A subsystem is defined as one of many functional components of a computer i.e., memory unit, central processing unit and input/output unit. The compute and graphics subsystems are important to this invention. The compute subsystems can scale up to multiple processors and the graphics can scale up to multiple graphics subsystems. This scalability allows 3-D graphics, image processing and live video to be calculated, manipulated and displayed in real time.

The flow diagram, shown in FIG. 7, illustrates the overall architecture of the main processor software 200 which supports the present invention. It is made up of the following software sections: (1) Initialization Database 200-a, (2) Data Input 200-b, (3) Processing Flow 200-c, and (4) Data Output 200-d.

The software 200 retrieves data from the database 200-a containing golf green topographic contours 106 and-stored television images which can be processed into a 3-D graphic display and merged with a live video feed of a golf match or tournament. In this process, the trajectory is calculated for the proper path 111 for a golf ball to travel across the green 100, in order for it to roll into the golf cup 101 or to come to rest within 18 inches of the cup 101.

The Initialization Database. 200-a contains the x,y,z contour values 106 and the stored television images which represent each green 100 on the golf course. This function positions the software 200 to the correct data in the Database 200-a and synchronizes and registers the Database 200-a to match the appropriate live video broadcast.

The Data Input function 200-b retrieves the x,y,z values which are to be displayed from the Database 200-a as contours 106. The software 200 then reads the contours 106 and green images for processing. The retrieval continues in an iterative manner until all data has been processed for the appropriate green 100.

The Processing Flow function 200-c calculates the orientation, tilt, zoom and pan of the broadcast cameras; performs edge matching of the outline of the contoured green 100 with the televised TV image of the outline of the selected golf green 100, using well-known pattern recognition techniques; merges these data; and calculates the best ball path trajectories 111 using the equations of motion presented previously. The Processing Flow function 200-c includes the determination of the correct data orientation necessary to match the desired camera's field of view 115. This function 200-c produces a composite of the contours 106 and images of the green in the perspective required by the changing camera positions.

The Output function 200-d merges the contours 106, images and best possible putt display 111 with the live video from the broadcast camera. A digitizer tablet, mouse, or pointer, mapped directly to a grid representing the golf green 100, is used to communicate and register the golf balls 102, 103, 104, and 105; the golf cup 101; and the shoulder-held camera 114 locations. Alternatively, the x,y,z coordinates of the golf balls 102, 103, 104, and 105, the golf cup 101, the platform camera 113, and the shoulder-held camera 114 can be determined through the use of laser surveying equipment.

These locations are used to orient the viewing angle and to calculate a best possible path 111 for putting the golf ball into the golf cup 101. This function merges all of the data together and seamlessly displays it, along with the golfers, on the real-time television broadcast.

FIG. 8 is a block diagram of the hardware components that make up the invention. These components are generally located in a production center situated on the golf property being televised but could be located at other suitable locations. Broadcast camera 140 records frames of video coverage which are forwarded to the production center. They are identified as signal BC-1. This camera 140 has a zoom lens and a zoom/focus sensor 152, known collectively as a "zoom sensor", connected to broadcast camera 140, which can sense the zoom in the camera and the focal distance of the camera lens. The analog output of sensor 152 is sent to an analog to digital converter 154, which converts the analog signal to a digital signal, and transmits the converted signal to processor 156. If a zoom sensor with a digital output is used as an alternative, there would be no need for the analog to digital converter 154.

Broadcast camera 140 is mounted on tripod 144 and has attached pan and tilt heads which allow broadcast camera 140 to pan and tilt. Pan sensor 146 and tilt sensor 148 are attached to tripod 144 and both are in communication with pan-tilt electronics 150. These units can alternatively be built into broadcast camera 140. In either case, pan sensor 146, tilt sensor 148, and zoom sensor 152 are considered to be coupled to broadcast camera 140 for the reason that they can sense the pan, tilt, and zoom of the broadcast camera 140.

Pan/tilt electronics 150 receives the output of pan sensor 146 and tilt sensor 148, converts the output to a digital signal representing those sensors and transmits the digital signal to processor 156. The pan, tilt, and zoom sensors are used to determine the field of view 115 of the broadcast camera 140, and can therefore be considered as field of view 115 sensors.

As a result of the pan, tilt, and zoom of the broadcast camera 140, the stored outline image of the green 100 is distorted and must be rotated, magnified or reduced, twisted, etc., as required, to match the changed perspective of the live video image of the green 100, so that the two images can be registered. Processor 200 can determine the proper orientation of the stored image of the green outline based upon the field of view data and/or may use pattern recognition techniques to achieve registration. By knowing where a platform camera is located, and the pan, tilt, and zoom of the camera, the computer can be programmed to determine how to configure the stored image of the green 100 to achieve registration with the video image observed by the broadcast camera.

Once the two images are registered, the computer will continuously compare the images, such that when the players walk onto the green 100, the images can be subtracted to define the occlusions i.e., the players images. The occlusions will be removed from the video feed and stored in database 200. The contours 106 will then be displayed over the green image and the occluded images retrieved and superimposed onto the contoured green and the combined video feed broadcast to the television audience. This processing of the data should result in a delay of less than one second and will air as live television.

Broadcasters use many broadcast cameras 140 on a golf course to televise a tournament event. Processor 200 is in communication with video control 202 and multiplexor 206. The video signals from the various cameras are sent to video control 202 which is used to select one broadcast camera 140 for transmission to the viewers. Video control 202 may include a plurality of monitors to have one for each video signal and will have a selection circuit which will enable a Director to monitor the various video signals and choose the signal to broadcast. The choice would be communicated to the selection circuit which selects one camera signal to broadcast and the selected choice is also communicated to processor 200, and multiplexer 206 via signal 208. The selected video signal is sent to delay 210 and processor 200 via analog to digital converter 212. There would be no need for a analog to digital converter 212, if the broadcast camera has digital capability.

The output of delay 210 is sent to video modification unit 214. The purpose for delay 210 is to delay the broadcast signal a fixed number of frames to provide time for processor 200 to receive data, determine the position of the green 100 in the frame of video and to prepare the enhancements required to display the contours 106 and the ball trajectories 111 onto the real-time video broadcast signal. The video picture is delayed a small number of frames, however since a ten frame delay is the equivalent of one-third of a second, and since it does not accumulate, the television signal is still considered to be a live signal.

Multiplexer 206 receives signals from the processors at each of the camera locations. For example, each of the processor signals, such as signal CB-1 are associated with a broadcast camera 140. The Director will communicate his choice of camera signals to be broadcast through the selection circuit to video control 202 which will relay the choice to multiplexer 206 so multiplexer 206 can send the selection to processor 200. The signal sent by multiplexer 206 to processor 200 includes the information from the field of view sensors which enable the processor to determine the cameras perspective and allows a presentation of the contour data 106 and ball trajectories 111 in the proper perspective. On a specific green 100, processor 156 can calculate the field of view 115 and relay the information, via multiplexer 206, to processor 200. Alternatively, processor 200 can receive the data via multiplexer 206 and determine the field of view 115.

Processor 200 is connected to video modification unit 214, and the output of unit 214 is designated as signal 226 and is the video signal which will be broadcast. This signal can be broadcast as is, or it can be sent for modification or recording to other hardware. Video modification unit 214 modifies the video signal from delay 210 with the data/signal from processor 200. The type of modification of the broadcast signal will vary depending upon the desired graphic results.

An alternative embodiment of this invention would be the broadcast of a televised signal which would split the TV screen to allow a real-time view of a players putt to be shown on one side, or at the top or bottom of the TV screen, while the image of the same green 100, which has been retrieved from the database, would be shown on the other portion of the screen, minus the golfer whose turn it is to putt. This remaining portion of the TV screen would present the contours 106, the players golf ball position, the position of the golf cup 101, and the trajectory 111 of the putt required for the ball to go into the cup 101 or to come to rest within 18 inches of the cup 101. This embodiment would enable the viewers to observe both the players putt on the real-time portion of the screen, and the contour 106 of the green 100 and the trajectory 111 required for this particular putt to be successful on the other portion of the screen. Some of the advantages of this embodiment would be the substantial reduction in computer power required to implement the presentation and the ability to give the viewers an interesting view of the players putt from a lateral perspective when there is no shoulder-held camera 114 in position behind the player to show the preferred in-line view of the putt.

Another embodiment of the present invention, would be the use of video tapes of the greens 100 on golf courses throughout the world, as a teaching aid in reading the break of a putt and/or to become familiar with the slopes of the greens 100 of a particular course before playing the course. Additionally, a black and white or colored version of the greens contours 106 could be published in a binder so that a player could carry the binder with them on the course to aid them in reading the trajectory 111 of their putts. Another useful embodiment would be the presentation of the greens 100 on a hand-held optical device with a screen on which the player could bring up a contoured image of the green being played. This would assist them in reading the slopes of the green and improving their selection of the trajectory 111 of the putt, and should result in a dramatic improvement in their putting ability. The contours 106 could be graphically presented in any selected color and contour line symbol. When the player touched the screen with a pointer at the approximate location of their golf ball, the trajectory of their line would appear on the screen to assist them in reading the putt.

The foregoing detailed description of the invention has been presented for the purposes of illustration and description. It is not intended to limit the invention to the exact form disclosed, and obviously many modifications and variations are possible through the use of the above teachings by persons skilled in the art.

We claim:

1. A system for television broadcasting of golf matches, comprising:

means for obtaining and inputting to a system control computer detailed topographic measurement data of a selected golf green;

means for generating, in response to said topographic data, golf green contours on a selected interval on said selected green;

means for generating a real-time live television image of play on said selected green;

means for registering from said real-time television image, rest positions of golf balls on said selected green;

means for processing an equation of motion for a golf ball registered on said selected green to obtain an optimal trajectory to an approximate golf cup location on said selected green; and means for combining said real-time image and said trajectory into a single television image for television broadcast in real-time.

2. The system of claim 1 wherein said means for processing an equation of motion includes means for determining the influence on said trajectory of gravity, green contours, and friction.

3. The system of claim 2 wherein said means for processing an equation of motion further includes means for determining the influence on said trajectory of wind.

4. The system of claim 1 wherein said means for combining said real-time image and said trajectory into a single television image includes means for projecting said golf green contour data onto said real-time television image for broadcast.

5. The system of claim 4 wherein said means for projecting golf green contours onto said real-time television image further includes means for allowing golf players and other human beings to occlude said trajectory and contour data in said real-time television image.

6. The system of claim 1, and further comprising:
means for registering said topographic data with said television image using a feature adjacent said golf green.

7. The system of claim 6, wherein said feature comprises a sprinkler head.

8. The system of claim 6, wherein said feature comprises an edge of said green.

9. The system according to claim 1, and further comprising:
means for annotating the real-time live television image.

10. In a system for the live television broadcasting of golf matches, the improvement comprising:
means for inputting to a system control computer detailed topographic measurement data of a selected golf green;
means for generating in response to such topographic data, contours on a selected interval on said selected green; means for generating a real-time live television image of play on said selected green; means for registering from said real-time television image, rest positions of golf balls on said selected green; means for processing an equation of motion for a golf ball registered on said selected green to obtain an optimal trajectory to an approximate golf cup location on said selected green; and means for combining said real-time image and said trajectory into a single television image for television broadcast in real-time.

11. The system improvement of claim 10, and further including:
means for superimposing on a real-time television camera image, projections of said camera image, and projections of said contours on said selected green.

12. In a system for the live television broadcast of golf matches, the improvement comprising: means for obtaining and inputting to a system control computer detailed topographic measurement data of a selected golf green; means for generating, in response to said topographic data, golf green contours on a selected interval on said selected green; means for generating a real-time live television broadcast image of play on said green; means for registering from said real-time live television broadcast image, rest positions of golf balls on said selected green;
means for processing an equation of motion of a golf ball on said selected green, in response to said contours, to derive a trajectory; means for combining a display image of said trajectory and said real-time live television broadcast image on said selected green into a single television image for live broadcasting; and means for processing said equation of motion to derive a trajectory further includes the influence of frictional forces and wind forces on said trajectory of a golf ball.

13. A process for use in television broadcasting of golf matches, comprising the steps of:
(a) obtaining and inputting to a system control computer detailed topographic measurement data of a selected golf green;
(b) generating, in response to said topographic data, golf green contours on a selected interval on said selected green;
(c) generating at least one real-time live television image of golf play on said selected green;
(d) registering from said real-time television image rest positions of golf balls on said selected green;
(e) processing an equation of motion of at least one registered golf ball to obtain an optimal trajectory to an approximate golf cup location on said selected green.

14. The process of claim 13 and further including the step of:
combining said real-time image and said trajectory into a single television image suitable for broadcast.

15. The method of claim 14, wherein all of the steps are performed in real-time.

16. The method of claim 13, wherein the step of processing an equation of motion includes the step of determining the influence on said trajectory of at least: gravity, green speed, and green surface contours.

17. The method of claim 16, wherein the step of determining the influence on said trajectory includes at least that of friction or green Stimpmeter speed.

18. The method of claim 17, wherein the step of determining the influence on said trajectory includes at least that of wind.

* * * * *